United States Patent
Dippon et al.

(10) Patent No.: US 11,393,507 B1
(45) Date of Patent: Jul. 19, 2022

(54) AUTOMATIC LOG CREATION OF VIDEO RECORDING OF A DEVICE UNDER TEST

(71) Applicant: Rohde & Schwarz GmbH & Co. KG, Munich (DE)

(72) Inventors: Andreas Dippon, Munich (DE); Bernhard Sterzbach, Munich (DE); Byron-Lim Timothy Steffan, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/395,022

(22) Filed: Aug. 5, 2021

(51) Int. Cl.
*G11B 27/10* (2006.01)
*H04N 5/77* (2006.01)
*G06N 20/00* (2019.01)
*G06V 20/40* (2022.01)

(52) U.S. Cl.
CPC ............ *G11B 27/10* (2013.01); *G06N 20/00* (2019.01); *G06V 20/46* (2022.01); *H04N 5/77* (2013.01); *G06V 20/44* (2022.01)

(58) Field of Classification Search
CPC ........ G11B 27/10; G06N 20/00; G06V 20/46; G06V 20/44; H04N 5/77
See application file for complete search history.

(56) References Cited

U.S. PATENT DOCUMENTS

| | | | |
|---|---|---|---|
| 9,785,889 B2 | 10/2017 | Bechet et al. | |
| 9,858,634 B2 | 1/2018 | Sterzbach et al. | |
| 10,097,439 B1* | 10/2018 | Cai | H04W 4/025 |
| 2008/0129615 A1* | 6/2008 | Breit | H04W 56/00 |
| | | | 343/703 |
| 2015/0026824 A1 | 1/2015 | Kim et al. | |
| 2015/0081614 A1 | 3/2015 | Bechet et al. | |
| 2015/0154729 A1 | 6/2015 | Sterzbach et al. | |
| 2017/0147622 A1* | 5/2017 | Sterzbach | H04N 17/04 |

FOREIGN PATENT DOCUMENTS

| | | |
|---|---|---|
| DE | 102012211902 A1 | 1/2014 |
| DE | 102013224378 A1 | 3/2015 |
| EP | 3468206 A1 | 4/2019 |

* cited by examiner

*Primary Examiner* — Thai Q Tran
*Assistant Examiner* — Jose M Mesa
(74) *Attorney, Agent, or Firm* — Christensen O'Connor Johnson Kindness PLLC (57) ABSTRACT

A method for generating an event log in view of at least one test routine for a device under test, a logging system for logging at least one event frame for a device under test, a method for training a machine learning circuit to extract event frames from multimedia data, and a method for extracting event frames from multimedia data using a machine learning circuit trained are described.

20 Claims, 6 Drawing Sheets

AUTOMATIC LOG CREATION OF VIDEO RECORDING OF A DEVICE UNDER TEST

FIELD OF THE DISCLOSURE

Embodiments of the present disclosure generally relate to a method for generating an event log. Further, embodiments of the present disclosure relate to a logging system. Moreover, embodiments of the present disclosure relate to a method for training a machine learning circuit. Additionally, embodiments of the present disclosure relate to a method for extracting event frames.

BACKGROUND

Electronic devices such as mobile phones (also called smartphones) need to be tested subsequent to or during manufacturing thereof in order to verify whether the electronic devices fulfill the respective requirements. For example, the respective electronic devices, which are called devices under test (DUTs) during the respective tests, need to be checked for compliance with specific legislative regulations and/or performance characteristics.

It is common to apply protocol tests (test routines) and to evaluate the message log produced by the DUT during the testing in order to identify any irregularities. However, important aspects of the behavior of the DUT are missing in the message log, for example the output on a screen, particularly in case of testing mobile phones.

So far, the different kinds of information have to be gathered manually and evaluated in a manual approach by experienced test person, which in turn results in high costs as well as long durations. Particularly, it was necessary to perform the respective tests for each type of electronic device since they all have different characteristics, resulting in different approaches for the different types of electronic devices, thereby increasing the overall costs significantly.

Hence, there is a need for a cost-efficient and automatic procedure to reliably test a DUT while simultaneously reducing the operating expenses.

SUMMARY

The subject matter of the independent claims satisfies the respective need or others. Further embodiments are indicated within the dependent claims and the following description, each of which, individually or in combination, may represent aspects of the disclosure. Some aspects of the present disclosure are explained with regard to devices others with regard to methods. However, one or more of these aspects can be correspondingly transferred vice versa.

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below.

Some of the embodiments of the present disclosure relate to a method for generating an event log in view of at least one test routine for a device under test (DUT).

The test routine may be considered a procedure comprising data communication actions such as commands, requests, orders and/or queries towards or from the DUT in order to test the DUT in view of at least one property or rather characteristic.

The data communication may be direct or indirect, such as being individually addressed or being a broadcast type communication. The DUT may be any electric or electronic device that is desired to be tested. In some embodiments, the DUT may be a device with a display and/or audio output, for instance a mobile phone.

In some embodiments, the method comprises the step of performing the at least one test routine to test the device under test. In this regard, a test log is generated. The test log comprises test results and associated test time stamps with regard to the at least one test routine. Spoken differently, the test log may be considered a collection of the results of all individual portions of the test routine. For each entry of the collection, the respective test time stamp is associated thereto. In an alternative, the test log may additionally comprise the respective instructions of the test routine including commands, queries, orders to or from the DUT. Furthermore, a particular result achieved in view of a specific instruction of the test routine may be associated therewith. In addition, the test log may comprise additional information such as an underlying protocol type of the respective entry. The test log gathered when performing the test routine may also be called a message log.

In an embodiment, the method may further comprise the step of capturing multimedia data of the device under test by a capturing device while the at least one test routine is performed. The multimedia data comprises, for example, multiple frames that are associated with frame time stamps. Multimedia data may be considered any visual and/or acoustic information. However, the multimedia data may also relate to differently perceivable information being recordable by electronic acquisition systems, for instance data used for rendering or generating the graphic output, namely the visual information, such as instructions. The capturing device may be considered a data-recording device used for acquiring the perceivable information of the DUT. Optionally, the capturing device may comprise a data logger that captures a respective logic structure used for rendering the visual data, namely the display content.

In some embodiments, the method may also comprise the step of analyzing the multimedia data captured with regard to at least one key frame. A key frame may be considered a specialized frame being of relevance by referencing a starting or ending point of a particular action of the DUT (process of the DUT). The at least one key frame may be pre-determined. In an example, a start screen when turning on the DUT could represent a key frame.

In some embodiments, the key frame defines the starting and ending points of any smooth transition to be displayed. Contrary to the key frames, the illusion of a movement on a screen is obtained by so-called "in-betweens" which relate to frames filled between the key frames in order to create the illusion of movement.

In general, the key frames is a frame used to indicate the beginning or end of a change made to a parameter. For example, a key frame could be set to indicate the point at which audio will have faded up or down to a certain level. Hence, key frames also relate to audio data rather than video data only.

In some embodiments, the method comprises the step of assigning at least one frame which matches the at least one key frame to an event frame having an event frame time stamp. The event frame time stamp is determined by the frame time stamp of the frame which matches the at least one key frame. In other words, the multimedia data acquired by the capturing device is searched for a match with the at least one key frame. Any of the frames of the acquired data which matches the at least one key frame is assigned an event frame. Thereby, a particular portion of the acquired data can be linked to specific pre-determined specialized expected key frames which the DUT is expected to potentially show during the respective test routine performed. In other words, the event log may be considered a collection of events taking action while the test routine is performed, wherein a timely information is provided as well.

In some embodiments, the method may further comprise the step of storing the at least one event frame with the event frame time stamp within an event log. The at least one event frame time stamp is synchronized with the test time stamps. Due to the time synchronization, a link is provided between the event frames identified as described before and the underlying test routine based on which particular test results were obtained. Therefore, a distinct cross-relation is provided between the event frames and the exact portion of the test routine in which regard the respective event frame was determined. In other words, the test results obtained and provided by the test log are set in relation to the multimedia data captured, for example only the frames associated with key frames, thereby creating correlated data consisting of test results and event frames. The correlation of these differently obtained information is feasible due to the time stamps provided for the test results and the event frames, namely by the test time stamps and the event frame time stamps.

Accordingly, a method is provided which automatically identifies captured frames matching pre-determined key frames and which automatically generates an event log in view of these matching results. Accordingly, a large data amount is reduced to a compact event log which can be easily handled, searched or through which navigation is comfortably possible in order to gain even more insights into the test results if desired. This can be achieved since data obtained in the test log is merged with the event frames, thereby increasing the overall information content provided.

For example, a user may show several event frames simultaneously, for instance in a table format. Also, a user may navigate through multiple event logs using the key frames. In addition, the event frames of the event log may be used to further process the event log using scripting interfaces. Hence, access to the extracted event frames is possible by scripting interfaces, for example an automatic access. Accordingly, the process automation may be improved.

Advantageously, the extraction of event frames is independent of the type of the DUT. Hence, the method may be reliably applied to all different types of DUTs and, thus, any adaption of the method in view of different DUTs having different properties is not required. Hence, a large number of (different types of) DUTs can be tested in an automated manner, thereby reducing the test duration and, therefore, the costs associated therewith.

The multimedia data may be analyzed with regard to the key frames by a pattern recognition. Therefore, the process of identifying frames within the set of acquired data in view of the key frames may be even further automated. The pattern recognition may be fed with pre-determined key frames. The pattern recognition may be configured to identify event frames based on common properties or the like. The pattern recognition may be based on visual and/or audio data.

The capturing device may be a camera that is configured to record a display of the DUT, thereby capturing the multimedia data, e.g. a video (with or without sound). The capturing device may also take a screenshot of the display of the DUT in order to obtain the multimedia data, namely the video data or rather the image data. The display of the DUT may show highly relevant information, such as notifications, which may be recorded correspondingly. The camera may also be part of the DUT itself. Then, a mirror or multiple mirrors may be arranged such that the display of the DUT is recordable by the internal camera of the DUT itself.

The multimedia data may comprise audio and/or video data acquired with regard to the DUT. These data types are of high significance since the DUT commonly notifies any information by video and/or audio data.

The multimedia data may also comprise at least video data acquired with regard to a screen of the DUT that is tested by performing the at least one test routine. Most DUTs share notifications via their screens. Therefore, this information is most relevant and may allow the test routine and the acquired data to be evaluated at higher precision with regard to the key frames.

However, the multimedia data may also relate to data processed by the DUT in order to render the display, namely the output data to be outputted by the screen of the DUT. Hence, the capturing device may also relate to a circuit that is configured to capture a logic structure having instructions for rendering display content. The respective circuit may be integrated within the DUT or formed separately, but connected to the DUT by a data interface, for instance a Universal Serial Bus (USB) interface.

The event log may further comprise vicinity frames. The vicinity frames may be chronologically associated with the at least one event frame. In other words, the vicinity frames may comprise all frames of the multimedia data captured in view of the DUT which have been acquired prior or subsequent to a particular frame matching a key frame, for example within a defined time range. The vicinity frames, which have to be taken into account, may be determined in view of the event frame time stamp of the respective event frame. Including the vicinity frames within the event log provides, e.g., the possibility to check the event log around a key frame to easily identify relations between certain event frames. Accordingly, the vicinity frames may correspond to a certain number of frames prior or subsequent the event frame, namely the frame that matches the at least one key frame.

The vicinity frames may also have accompanying vicinity frame time stamps. A time period between an event frame time stamp and an associated vicinity frame time stamp may be smaller than a predetermined threshold time period. Accordingly, multiple vicinity frames may be taken into account and included in the event log. Determination of the respective frames of the multimedia data may be achieved via a comparison of the time stamps.

Hence, the vicinity frames correspond to the frames around the event frame.

In addition, the method may further comprise the step of filtering the event log with regard to the at least one event frame. Since the event log is automatically set up in view of the event frames, it enables easy navigation through the log in order to filter all event frames. Thus, a brief overview of the most important outcome may be easily provided to a user.

Furthermore, the filtering may also take the vicinity frames into account, namely those frames that are at or rather around the event frame. Thus, a certain sequence of frames can be obtained for further processing when filtering the event log accordingly, namely with regard to the at least one event frame and the vicinity frames.

Some of the embodiments of the present disclosure relate to a logging system for logging at least one event frame for a DUT. A test device performs at least one test routine to test the DUT. In an embodiment, the logging system comprises at least one multimedia data capturing device, a processor circuit, and a log memory. The at least one multimedia data capturing device captures multimedia data of the DUT while the at least one test routine is performed. The multimedia data comprises multiple frames that are associated with frame time stamps. The processor circuit assigns at least one frame matching at least one key frame to an event frame having a respective event frame time stamp. The processor circuit stores the at least one event frame with the event frame time stamp within an event log within the log memory. To this end, the processor circuit may be coupled to the log memory. The at least one event frame time stamp is synchronized with test time stamps of a test log generated with regard to the at least one test routine.

The logging system provides an efficient approach to evaluate acquired multimedia data of a DUT and to collect respective event frames being timely synchronized with the test performed, thereby obtaining a data fusion of test results obtained when performing the at least one test routine and the multimedia data captured. Consequently, the results of the test as well as the DUT, namely the multimedia data captured, may be analyzed with improved precision with less operating expenses. In addition, the logging system is configured for evaluating all different types of DUTs.

The processor circuit may apply a pattern recognition to identify frames matching the at least one key frame. Spoken differently, the captured multimedia data may be evaluated using a machine learning technique, for instance a machine learning trained by labeled data. This way, the efficiency of the evaluation of the multimedia data may be further automated and, thus, improved.

The multimedia data capturing device may comprise a video recording module comprising one or more circuits and/or an audio recording module comprising one or more circuits.

The multimedia data capturing device may comprise a data logger that captures a logic structure having instructions for rendering display content, wherein the capturing device analyzes the logic structure. As mentioned above, the respective instructions for rendering the display content correspond to the multimedia data.

The at least one multimedia data capturing device may perform a screen capturing of at least one screen of the device under test. An external or internal camera of the DUT may be used in this regard. Optionally, a mirror arrangement may be applied to appropriately inspect the screen of the DUT.

The DUT may be arranged inside an anechoic chamber while the at least one test routine is performed. An anechoic chamber may provide well-defined test conditions. Thereby, noise from external sources may be avoided such that the data quality and consequently the test results obtained may be improved. The multimedia capturing device may be external of the DUT and arranged inside the anechoic chamber. However, the multimedia capturing device, for example when established by the data logger, may also be integrated within the DUT.

In general, methods for generating an event log as well as logging systems are inter alia disclosed herein are used to identify interesting changes of multimedia data (key frames), such as on the display of the DUT or in the audio output. While doing so, the respective key frames are automatically identified as a specific event and marking this one accordingly, namely as event frames. The event frames and their associated event frame time stamps are synchronized with test results, for example the test time stamps, which are obtained when performing the at least one test routine. By synchronizing the different information gathered, an event log is generated that encompasses different types of data or rather information. Hence, a data fusion is obtained that ensures to easily find relationships between the test results gathered when performing the test routine and the key frames associated with the multimedia data captured.

Further, embodiments of the present disclosure also relate to a method for training a machine learning circuit to extract event frames from multimedia data that comprises multiple frames. In an embodiment, the method comprises the step of providing the multimedia data to the machine learning circuit as input data. Additionally, the method comprises the step of providing an accessibility recording and/or a logic structure with instructions for rendering display content as expected output. In addition, the method comprises the step of running the machine learning circuit to automatically recognize an event frame in the multimedia data. Thereby, an estimated output is provided to the machine learning circuit. The event frame is a frame of the multimedia data matching at least one key frame. In other words, the event frame is a frame of the multimedia data, which matches the at least one key frame, namely a frame indicating the beginning or end of a change made to a parameter. Moreover, the method comprises the step of comparing the expected output with the estimated output in order to identify deviations of the estimated output with respect to the expected output.

The input data used for training the machine learning circuit may relate to labelled data. Hence, the multimedia data has been tagged with at least one label. Thus, the expected output may correspond to the respective label associated with raw input data, namely the multimedia data usually obtained when performing the test routine. In other words, the machine learning circuit may be trained by presenting to the machine learning circuit the multimedia data, for instance a video recording, as an input and by presenting a logic structure or rather an accessibility recording as an expected output.

Thus, the machine learning circuit may be enabled to convert the video data into a logical structure, namely the data used by the DUT to provide the respective video data on the screen.

The training of the machine learning circuit can be done in an automated manner. In some embodiments, the efficiency of training is improved. In some embodiments, the machine learning circuit is trained by using the multimedia data captured, for instance a video recording.

During the training phase, the machine learning circuit attempts to automatically recognize an event frame, namely a frame matching the at least one key frame.

Generally, the evaluation of the captured multimedia is further developed by providing machine learning capabilities trained such that the data may be automatically evaluated in view of the key frames.

Once the machine learning circuit has been trained appropriately, it can be applied on several different types of DUTs such that it is not necessary to provide individual key frame extraction algorithms for the different types of the DUTs. Therefore, the trained machine learning circuit is enabled to perform the respective analysis on unknown DUTs, thereby improving the overall time necessary for testing several different types of DUTs, for example in an automated manner.

In addition, further embodiments of the present disclosure relate to a method for extracting event frames from multimedia data using a machine learning circuit trained according to the method described above. In an embodiment, the method for extracting event frames comprises the step of providing multimedia data to the trained machine learning circuit as an input. The method additionally comprises the step of extracting at least one event frame from the multimedia data using the trained machine learning circuit.

Using the machine learning as described hereinabove provides the possibility to identify the relevant frames, namely the event frames, within the multimedia data at even further reduced operating expenses since the identification can essentially be performed fully automated. Hence, the test procedure is improved as a whole with regard to prior art procedures which require individual adjustments, for example in view of different DUT types. Such adjustments may be omitted using the procedure described herein.

The trained machine learning circuit does not rely on any specific firmware version. Hence, the machine learning may be applied to perform the key frame extraction of unknown DUTs just by analyzing the recorded multimedia data without additional instrumentation or configuration. For example, the machine learning is trained in view of a specific firmware version, such as X. However, the machine learning may also be applied in view of any different firmware version, such as X.1.

The trained machine learning circuit is configured to convert video data obtained as multimedia data into a logic structure.

In addition, the trained machine learning circuit is configured to recognize changes in the logic structure from one video frame to the other and derive events from the changes recognized, thereby identifying the event frames. In some embodiments, the respective changes are associated with key frames.

In an example application, the machine learning circuit may be distributed as an application, e.g., for the respective DUTs. In this case, the event log may be created without an additional multimedia recording. In other words, it may be omitted to repeatedly train a machine learning circuit on those DUTs which are newly equipped with the distributed machine learning circuit since the training experiences (decision-making behavior) may already be included therein.

The at least one extracted event frame may be assigned with an event frame time stamp. The extracted event frame and the event frame time stamp may be stored in an extracted event log, for example inside a log memory.

The machine learning circuit may convert each frame of the multimedia data into a logic representation. The logic representation may be considered an intrinsic command structure of the respective frame. In other words, for each frame it is determined which type of action of the DUT the respective frame represents.

The logic representation is a representation of the respective multimedia data, e.g., the video data obtained, wherein the representation is a logic one that comprises the respective command structure. Therefore, the logic representation corresponds to a logic structure used by the DUT for rendering display content.

In some embodiments, the logic representation differs from the logic structure in that the logic representation is obtained by converting the multimedia data, e.g., video and/or audio data, in order to obtain the command structure, whereas the logic structure itself is internally processed by the DUT in order to generate the display content. However, the information of the logic representation and the information of the logic structure is similar. In other words, the DUT processes the logic structure in order to generate display content, which may be captured and converted into the logic representation.

The machine learning circuit may be updatable with regard to its decision-making behavior and/or using user experience characteristics. For example, the curated information from the users may be fed back into the machine learning circuit to further improve the precision of the determination of the event frames and/or to keep the machine learning circuit up-to-date. Hence, the machine learning circuit trained will be trained further in field, e.g., at the customer side.

The machine learning circuit may be distributable. This means that the trained machine learning circuit may be distributed to users so that these automatically receive the additional key frame logs for any new device which are tested. In some embodiments, the machine learning circuit is updated regularly due to improvements made, for instance by other users.

Generally, the accessibility recording is a logic representation of display content. This is also used for so-called "screen reader" which is an assistive technology that renders text and image content as speech or braille output. In other words, the accessibility recording is inter alia used for developing software for handicapped/blind persons.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

Figure 1:
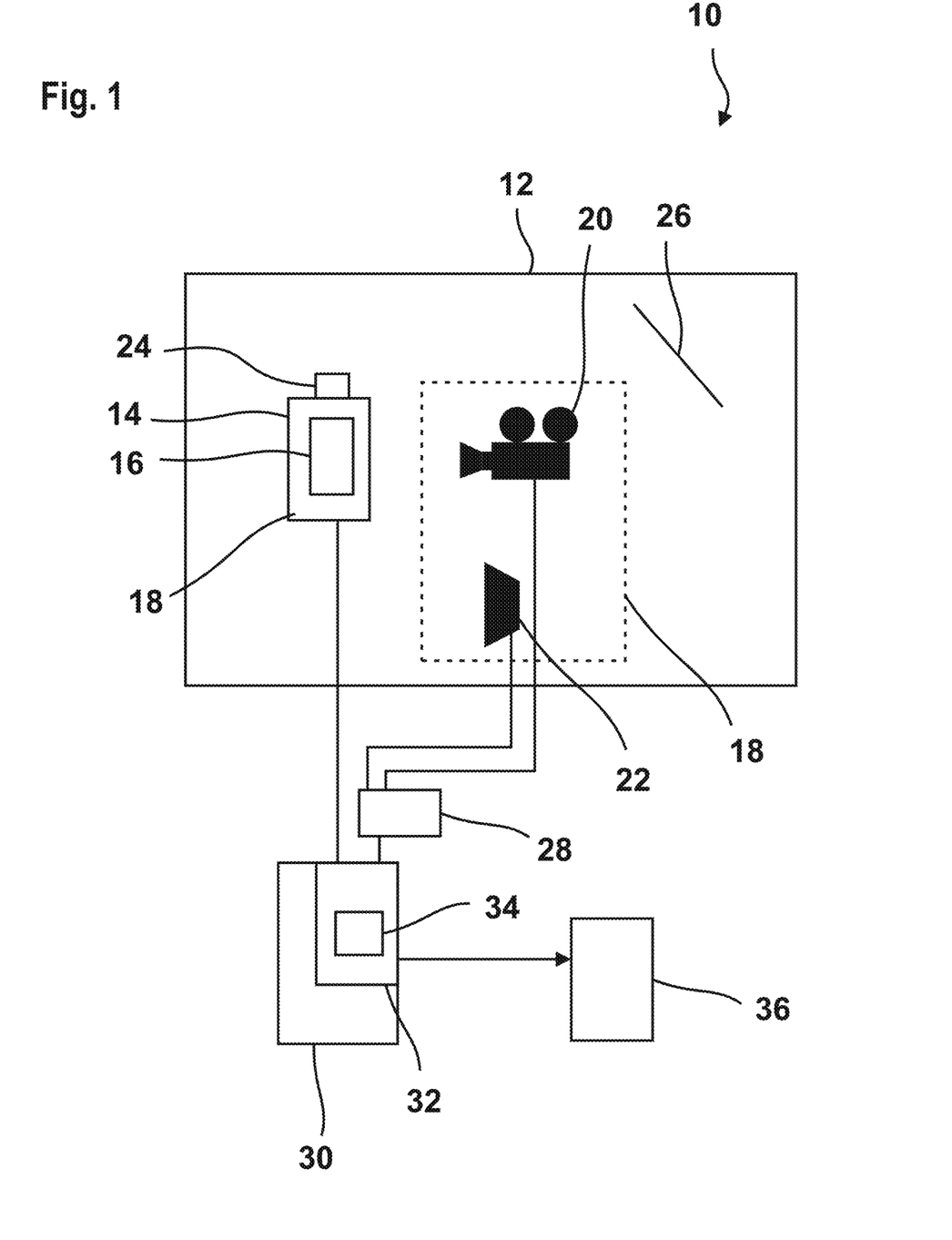
FIG. 1 is a schematic drawing of a representative logging system.

Turning now to FIG. 1, there is shown a schematic drawing of a logging system 10. The logging system 10 comprises an anechoic chamber 12. Inside the anechoic chamber 12 a device under test (DUT) 14 is arranged.

The anechoic chamber 12 is configured to shield external noises or radiation towards an interior space of the anechoic chamber 12 used for testing the DUT 14. Therefore, the quality of the data acquired in view of the DUT 14 may be improved and, therefore, the test results obtained are more reliable.

In the embodiment shown, the DUT 14 comprises a screen 16 that is used for displaying icons or other kind of information. In general, via the screen 16 the DUT 14 may show notifications or other status information. Moreover, the DUT 14 may include a loudspeaker or other transducer for outputting audio data, for example together with video data display on the screen 16. However, the DUT 14 may also only display icons on the screen 16 rather than videos with sound, for instance a bell icon for an incoming call or rather an icon representing the available network connection like 4G or rather 5G.

The logging system 10 may also comprise a multimedia data capturing device 18. Here, the multimedia data capturing device 18 comprises a video data capturing device 20, such as a camera. In some embodiments, the multimedia data capturing device 18 also comprises an audio data capturing device 22, namely a microphone. Via the video data capturing device 20 video data of the DUT 14 and, in particular of the screen 16 of the DUT 14 may be acquired. Via the audio data capturing device 22 audio data of the DUT 14 and, in particular of the loudspeaker of the DUT 14 may be acquired.

As shown in FIG. 1, the multimedia data capturing device 18 comprises both components, namely the video data capturing device 20 and the audio data capturing device 22, such that audio data and video data can be captured simultaneously if necessary. Generally, multimedia data is captured by the multimedia data capturing device 18.

However, the multimedia data capturing device 18 may also relate to a data logger that captures a respective logic structure used for rendering the visual data, namely the display content. As shown in FIG. 1, this kind of multimedia data capturing device 18 may be integrated within the DUT 14 itself since it captures the data used for rendering the display content, e.g. the respective instructions.

Generally, the multimedia data comprise multiple frames which have associated frame time stamps.

The multimedia capturing device 18 is coupled to an analyzing component 28, e.g., an analyzing circuit. The analyzing component 28 may also be internal of the multimedia capturing device 18. The analyzing component 28 is configured to analyze the captured multimedia data.

The analyzing component 28 and the DUT 14 are coupled to a processor circuit 30. In some embodiments, the analyzing component 28 may also be integrated within the processor circuit 30. Accordingly, the processor circuit 30 may bi-directionally communicate, for instance via a field bus, with the DUT 14 as well as with the analyzing component 28 or the multimedia data capturing device 18.

This means that the processor circuit 30 may receive acquired multimedia data from the multimedia data capturing device 18. Also, the processor circuit 30 may communicate with the DUT 14 to run at least one test routine in this regard. Spoken differently, the processor circuit 30 may send commands, queries, instructions and/or orders to the DUT 14 in order to test the DUT 14 with regard to at least one property. Accordingly, based on the test routine a test log is generated including test results and respective test time stamps associated therewith.

In some embodiments, the DUT 14 comprises an internal camera 24. A mirror 26 may be arranged inside the anechoic chamber 12 such that the internal camera 24 may capture video data presented on the screen 16 of the DUT 14 itself. Accordingly, such acquired multimedia data may also be received by the processor circuit 30. As already indicated above, the DUT 14 may comprise its own multimedia data capturing device 18.

In some embodiments, the processor circuit 30 comprises a machine learning circuit 32, for example in addition with a pattern recognition 34. Therefore, the received multimedia data may be analyzed based on an artificial intelligence, for example a trained one.

For example, the machine learning circuit 32 and/or pattern recognition 34 may be applied to evaluate the frames of the captured multimedia data in view of key frames. Accordingly, the processor circuit 30 is configured to assign frames which match key frames to event frames. The respective frame time stamps are assigned the corresponding event frame time stamps of the respective event frames. In other words, the frames that match the key frames are recognized and marked accordingly, namely as event frames indicating of an event that goes with a change of a certain parameter detected, for instance a new icon displayed or rather a changing icon such as a change from a 4G icon to a 5G icon.

The processor circuit 30 is coupled to a log memory 36. Inside the log memory 36, the event frames and associated event frame time stamps are stored by the processor circuit 30. Consequently, an event log is established or rather generated, which comprises the event frames and the associated event frame time stamps. The event frames stored inside the event log within the log memory 36 are timely synchronized with the test time stamps of the test log, which is possible due to the time stamps provided for the different kind of data gathered.

In other words, the event log corresponds to a data fusion of test results obtained when performing the at least one test routine and event frames recognized when analyzing the multimedia data captured. Therefore, relationships among these different kinds of data can be identified.

Figure 2:
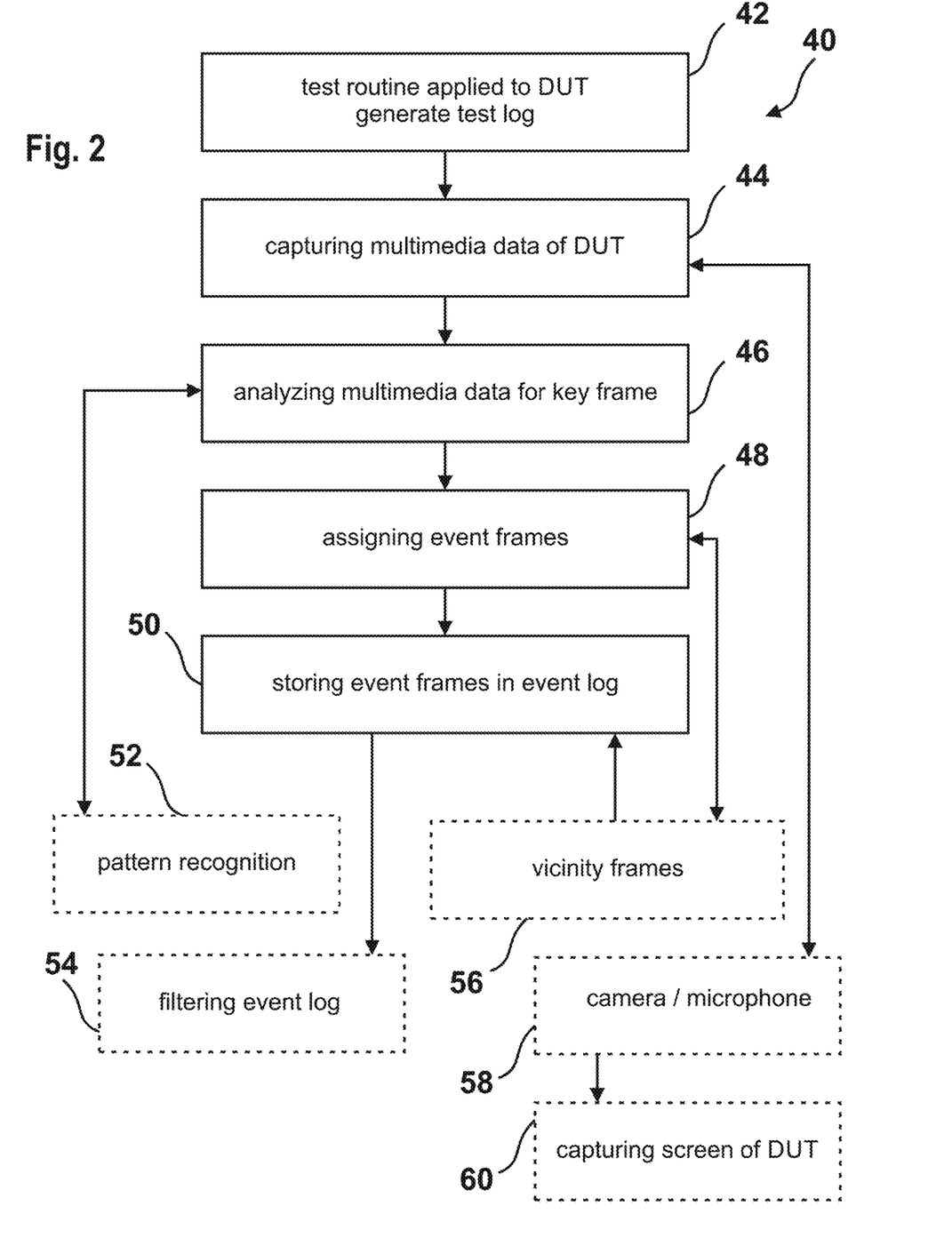
FIG. 2 is schematic drawing of a representative method for generating an event log.

FIG. 2 is schematic drawing of a representative method 40 for generating such an event log. As shown in FIG. 2, the method comprises the initial step 42 of performing at least one test routine to test the DUT 14. Within this step, a test log is generated, comprising information about the architecture of the at least one test routine and the respective results. The entries of the test log, for example the test results, have associated test time stamps. Generally, the test log is also called message log.

In step 44, multimedia data are captured with regard to the DUT 14 by a multimedia capturing device 18. The multimedia data are captured while the at least one test routine is performed. The multimedia data comprises multiple frames that are associated with frame time stamps. Optionally, the multimedia data may be acquired by a camera and/or a microphone according to step 58. Hence, the multimedia data may comprise video and/or audio data captured in view of the DUT while the at least one test routine is performed. As another option, the multimedia data may be acquired according to step 60 by capturing at least information of the screen of the DUT while the at least one test routine is performed. Furthermore, the logic structure is captured as multimedia data, which is used for rendering the display content appropriately, e.g., the respective instructions used for providing the display output.

In step 46, the multimedia data are analyzed with regard to key frames. Accordingly, it is checked whether a respective frame of the multimedia data captured matches at least one key frame. The key frames may be pre-determined and stored. Alternatively, the key frames are determined by beams of comparison of frames in order to recognize a certain change of parameter. In this regard, optionally pattern recognition 52 may be applied.

In step 48, those frames which match at least one key frame are assigned event frames. The respective frame time stamps of the matching frames, namely the event frames, are thus assigned event frame time stamps of the respective event frames.

In step 50, the identified event frames and the respective event frame time stamps are stored within an event log inside the log memory 36. In this regard, the event frame time stamps are timely synchronized with the test time stamps of the test log. Therefore, appropriate correlations are built up with the identified event frames in view of the architecture of the at least one test routine.

The method 40 may also comprises optional step 56. In this step 56, vicinity frames which are chronologically associated to the event frames are also determined, namely frames prior and/or subsequent to the event frame(s). This means that those frames are determined which have been captured within a pre-determined threshold time period prior to and/or subsequent to an event frame. These vicinity frames have respective vicinity frame time stamps and are stored within the event log as well. The vicinity frames in principle enable the possibility to further evaluate identified event frames for correlations between them. Therefore, the behavior of the DUT 14 associated with a key frame can be analyzed in more detail, as any changing performance of the DUT 14 can be identified, which results in the key frame, namely the change of parameter.

Figure 3:
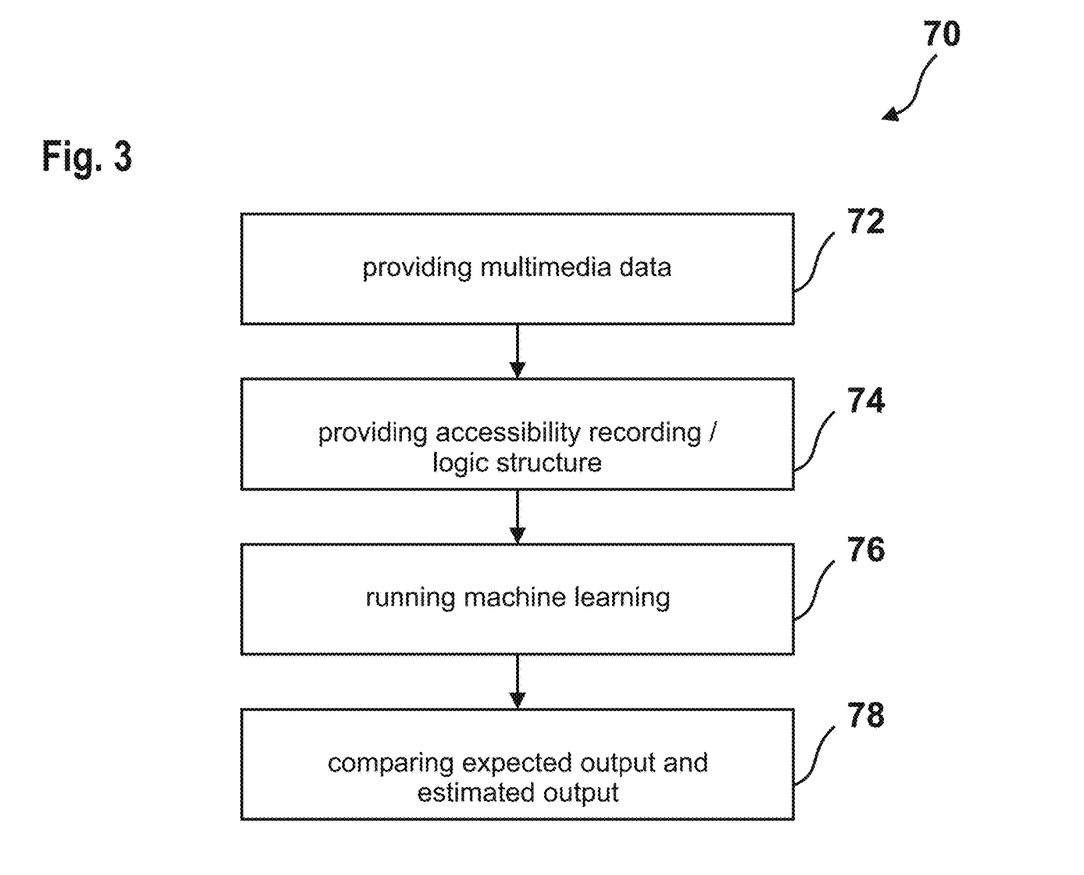
FIG. 3 is a schematic drawing of a representative method for training a machine learning circuit to extract event frames from multimedia data.

FIG. 3 is a schematic drawing of a representative method 70 for training the machine learning circuit 32 to extract event frames from multimedia data.

In step 72, multimedia data is provided to the machine learning circuit 32 as input data. The multimedia data comprises multiple frames. Thus, the multimedia data corresponds to the one that the machine learning circuit 32 is dealing with when performing the method for generating the event log.

In step 74, accessibility recording and/or a logic structure having instructions for rendering display content as expected output are/is provided to the machine learning circuit 32. This means that the machine learning circuit 32 obtains information what the received multimedia data is associated with. In other words, the machine learning circuit 32 received labelled input data, namely the (raw) multimedia data together with the labels, namely the expected output.

In step 76, the machine learning circuit 32 is run to automatically recognize an event frame within the multimedia data. Therefore, an estimated output is provided. As already mentioned, an event frame is a frame matching at least one key frame.

Then in step 78, the expected output is compared to the estimated output in order to identify deviations of the estimated output with respect to the expected output. Thereby, the machine learning circuit 32 is put into shape to adapt the treatment of the multimedia data such that ultimately the expected output fully corresponds to the estimated output.

In order to achieve this, the respective steps are repeated several times in order to reduce the deviations between the expected output and the estimated output provided by the machine learning circuit 32. In other words, the machine learning circuit 32 is trained based on labeled learning how the multimedia data shall be analyzed and treated. Thus, the machine learning circuit 32 is trained a decision-making behavior in view of treating the multimedia data.

Figure 4:
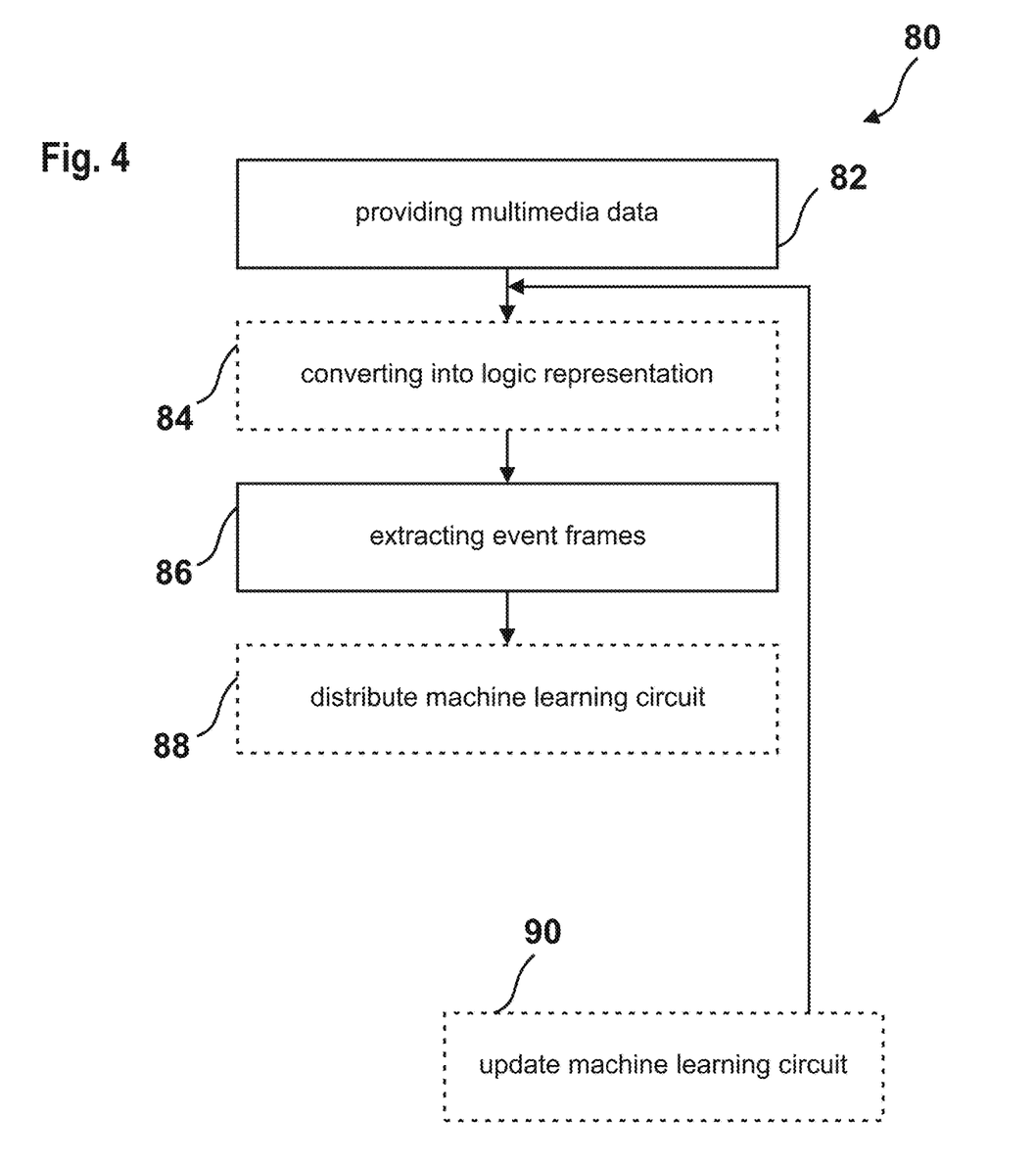
FIG. 4 is a schematic drawing of a representative method for extracting event frames from multimedia data using a machine learning circuit.

FIG. 4 is a schematic drawing of a representative method 80 for extracting event frames from multimedia data using the machine learning circuit 32 which has been trained as described herein before.

In step 82, multimedia data comprising multiple frames of a DUT 14 are provided to the machine learning circuit 32.

In the optional step 84, each frame of the multimedia data is converted into a logic representation. The logic representation may be considered an intrinsic command structure of the respective frame. In other words, for each frame it is determined which type of action of the DUT 14 the respective frame represents.

The conversion relates to converting visual data obtained into the respective command structure based on which the DUT 14 has rendered the display content previously. Thus, the logic representation may relate to a re-conversion of the video data captured that was obtained when the DUT 14 processes the logic structure that comprises the instructions for rendering the display content.

Subsequently, in step 86, at least one event frame is extracted from the multimedia data by the machine learning circuit 32 using the trained decision-making behavior as described above.

As another option, the machine learning circuit 32 may be distributed in step 88 to DUTs 14 such that the DUTs 14 are provided with the possibility to evaluate multimedia data with regard to event frames without the need for self-training a machine learning circuit 32.

Hence, the need for repeated training procedures is avoided. This may be beneficial for newly developed or manufactured DUTs 14 which may simply be equipped with the respective machine learning circuit 32. Thus, the newly developed or manufactured DUTs 14 already comprise the respective decision-making behavior.

The machine learning circuit 32 may be hardware-implemented or software-implemented.

As an additional option, the machine learning circuit 32 may also be updatable according to step 90. This means that the decision-making behavior (extraction mechanism) of event frames out of the multimedia data may be adapted based on the experiences made by individual DUTs 14. As an example, a DUT 14 equipped with a machine learning circuit 32 may update its intrinsic analyzing behavior by the experiences thus made when analyzing the multimedia data. This may also be considered a feedback mechanism.

Figure 5:
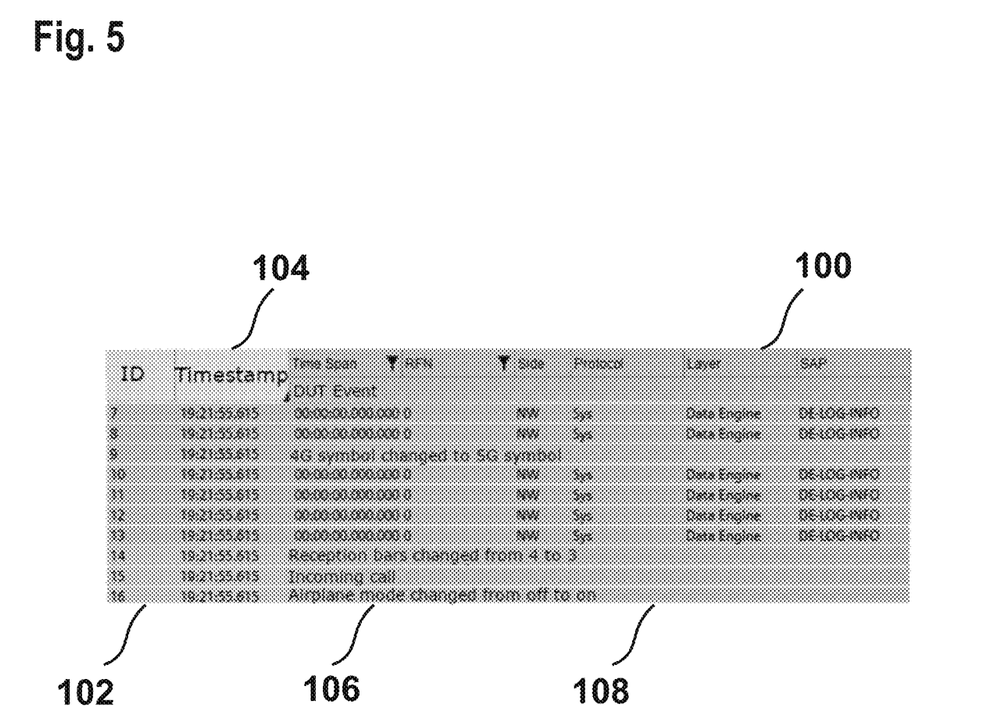
FIG. 5 is a schematic drawing of a representative event log.

FIG. 5 is a schematic drawing of an event log 100. In the embodiment of FIG. 5, the event log 100 comprises several entries in form of event frames 102 having associated event frame time stamps 104. The event frame time stamps 104 are time synchronized with test time stamps of the test log generated in view of the at least one test routine performed on the DUT based on which the event frames are identified.

As an option, in this embodiment the event log 100 also comprises associated logic representations 106 of the respective event frames 104. The logic representation 106 may describe an intrinsic command structure of the respective frame. In other words, the logic representation 106 may describe a particular event type in view of which the respective event frame has been determined. As another option, the event log 100 may also comprise additional information 108 such as underlying protocol types of the event frames and so on.

Figure 6:
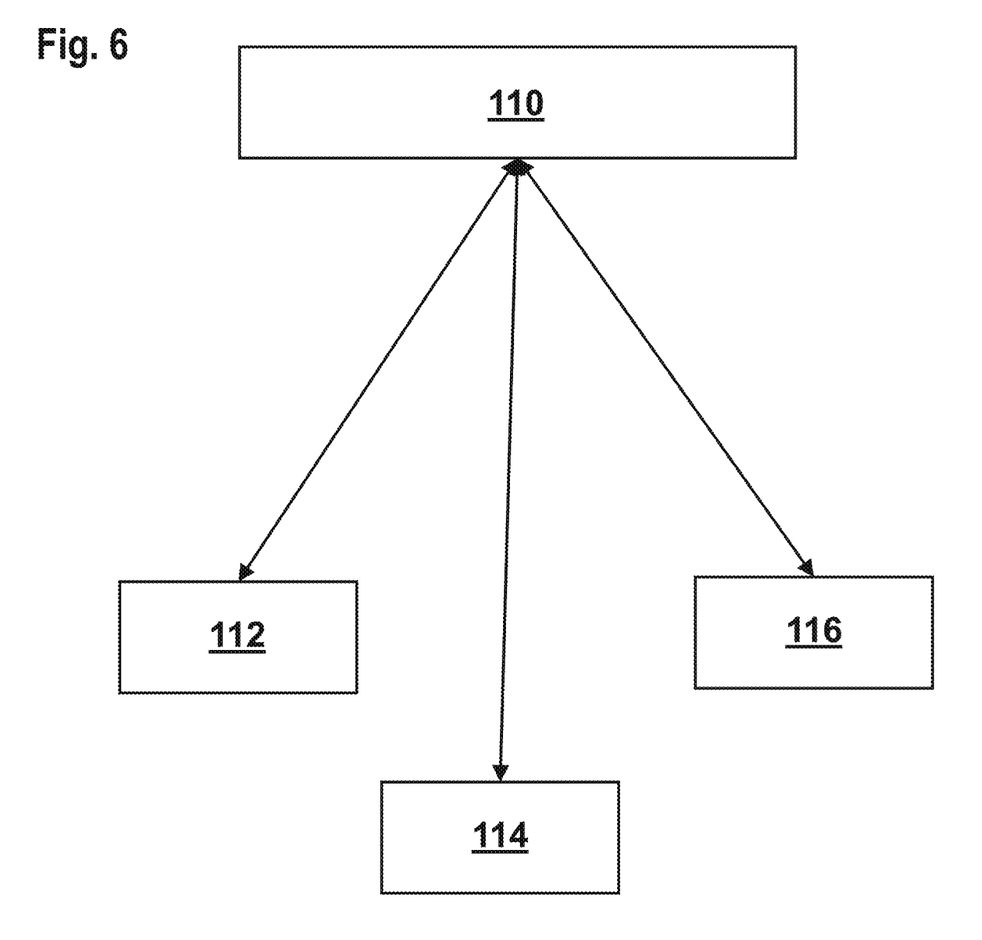
FIG. 6 is a schematic drawing of a representative network architecture of the machine learning circuit.

FIG. 6 is a schematic drawing of a representative network architecture of the machine learning circuit 32. A central device such as a server 110 may communicate via a field bus with several DUTs 112, 114, 116. The communication may be bi-directional. This way, the machine learning circuit 32 may be distributed from the server 110 to the DUTs 112, 114, 116. Furthermore, the DUTs 112, 114, 116 may feedback respective experiences from the evaluation of multimedia data. Accordingly, a machine learning circuit 32 may be updated in view of its decision-making behavior by the server 110 based on the received information. Subsequently, the updated machine learning circuit 32 may again be distributed. This way, the machine learning circuit is kept up-to-date.

Certain embodiments disclosed herein, for example, utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

Of course, in some embodiments, two or more of these components, or parts thereof, can be integrated or share hardware and/or software circuitry, etc. In some embodiments, these components, or parts thereof, may be grouped in a single location or distributed over a wide area. In circumstances where the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for generating an event log in view of at least one test routine for a device under test, the method comprising:
    performing the at least one test routine to test the device under test, wherein a test log is generated, the test log comprising test results and associated test time stamps with regard to the at least one test routine;
    capturing multimedia data of the device under test by a capturing device while the at least one test routine is performed, wherein the multimedia data comprises multiple frames that are associated with frame time stamps;
    analyzing the multimedia data captured with regard to at least one key frame;
    assigning at least one frame which matches the at least one key frame to an event frame having an event frame time stamp; and
    storing the at least one event frame with the event frame time stamp within an event log, wherein the at least one event frame time stamp is synchronized with the test time stamps.

2. The method according to claim 1, wherein the multimedia data is analyzed with regard to the key frames by a pattern recognition.

3. The method according to claim 1, wherein the capturing device is a camera that is configured to record a display of the device under test, thereby capturing the multimedia data.

4. The method according to claim 1, wherein the multimedia data comprises audio and/or video data acquired with regard to the device under test.

5. The method according to claim 1, wherein the multimedia data comprises at least video data acquired with regard to a screen of the device under test that is tested by performing the at least one test routine.

6. The method according to claim 1, wherein the event log further comprises vicinity frames, wherein the vicinity frames are chronologically associated with the at least one event frame.

7. The method according to claim 6, wherein the vicinity frames have accompanying vicinity frame time stamps, wherein a time period between an event frame time stamp and an associated vicinity frame time stamp is smaller than a predetermined threshold time period.

8. The method of claim 1, further comprising the step of filtering the event log with regard to the at least one event frame.

9. A logging system for logging at least one event frame for a device under test, wherein a test device performs at least one test routine to test the device under test, the logging system comprising:
 at least one multimedia data capturing device, a processor circuit, and a log memory,
 wherein the at least one multimedia data capturing device is configured to capture multimedia data of the device under test while the at least one test routine is performed, wherein the multimedia data comprises multiple frames that are associated with frame time stamps,
 wherein the processor circuit is configured to:
  assign at least one frame matching at least one key frame to an event frame having a respective event frame time stamp; and
  store the at least one event frame with the event frame time stamp within an event log within the log memory, and
 wherein the at least one event frame time stamp is synchronized with test time stamps of a test log generated with regard to the at least one test routine.

10. The logging system of claim 9, wherein the processor circuit is configured to apply a pattern recognition to identify frames matching the at least one key frame.

11. The logging system of claim 9, wherein the multimedia data capturing device comprises a video recorder circuit and/or an audio recorder circuit.

12. The logging system of claim 9, wherein the multimedia data capturing device comprises a data logger that captures a logic structure having instructions for rendering display content.

13. The logging system of claim 9, wherein the at least one multimedia data capturing device performs a screen capturing of at least one screen of the device under test.

14. The logging system of claim 9, wherein the device under test is arranged inside an anechoic chamber while the at least one test routine is performed.

15. A method for training a machine learning circuit to extract event frames from multimedia data, wherein the multimedia data comprises multiple frames, the method comprising:
 providing the multimedia data to the machine learning circuit as input data;
 providing an accessibility recording and/or a logic structure with instructions for rendering display content as expected output;
 running the machine learning circuit to automatically recognize an event frame in the multimedia data, thereby providing estimated output, wherein the event frame is a frame matching at least one key frame; and
 comparing the expected output with the estimated output in order to identify deviations of the estimated output with respect to the expected output.

16. A method for extracting event frames from multimedia data using a machine learning circuit trained according to the method of claim 15, wherein the method for extracting event frames comprises:
 providing the multimedia data to the trained machine learning circuit as an input, and
 extracting at least one event frame from the multimedia data using the trained machine learning circuit.

17. The method according to claim 16, wherein the at least one extracted event frame is assigned with an event frame time stamp, wherein the extracted event frame and the event frame time stamp are stored in an extracted event log.

18. The method according to claim 16, wherein the machine learning circuit is configured to convert each frame of the multimedia data into a logic representation.

19. The method according to claim 16, wherein the machine learning circuit is configured to be updatable with regard to its decision-making behavior and/or using user experience characteristics.

20. The method according to claim 16, wherein the machine learning circuit is distributable.

* * * * *